(12) United States Patent
Woo et al.

(10) Patent No.: US 11,733,709 B2
(45) Date of Patent: Aug. 22, 2023

(54) PERSONAL MOBILITY AND CONTROL METHOD THEREOF

(71) Applicants: HYUNDAI MOTOR COMPANY, Seoul (KR); KIA MOTORS CORPORATION, Seoul (KR)

(72) Inventors: Seunghyun Woo, Seoul (KR); Minjae Park, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 354 days.

(21) Appl. No.: 17/077,201

(22) Filed: Oct. 22, 2020

(65) Prior Publication Data

US 2022/0011781 A1 Jan. 13, 2022

(30) Foreign Application Priority Data

Jul. 9, 2020 (KR) .................. 10-2020-0084911

(51) Int. Cl.
*G05D 1/02* (2020.01)
*G07C 5/08* (2006.01)
*G08G 1/00* (2006.01)

(52) U.S. Cl.
CPC ......... *G05D 1/0295* (2013.01); *G07C 5/0808* (2013.01); *G08G 1/22* (2013.01)

(58) Field of Classification Search
CPC combination set(s) only.
See application file for complete search history.

(56) References Cited

U.S. PATENT DOCUMENTS 10,902,726 B2 *  1/2021  Alvarez ................. G08G 1/162
2021/0325900 A1* 10/2021  Paul ..................... G05D 1/0293

FOREIGN PATENT DOCUMENTS

KR    10-2018-0062810 A    6/2018

* cited by examiner

*Primary Examiner* — Peter D Nolan
*Assistant Examiner* — Jacob Kent Besteman-Street
(74) *Attorney, Agent, or Firm* — Morgan, Lewis & Bockius LLP

(57) ABSTRACT

It is an aspect of the present disclosure to provide a personal mobility capable of adjusting a shape of a cluster in performing platooning and a control method thereof. In accordance with one aspect of the disclosure, a personal mobility performing platooning includes: a transceiver; and a controller configured to determine a movement command for a slave of the platooning based on driving information when the personal mobility is configured as a master of the platooning and adjust a cluster shape of the platooning by controlling the transceiver to transmit the movement command to the slave.

16 Claims, 9 Drawing Sheets

10 : 10a, 10b

10 : 10a, 10b
10a : 10a-1, 10a-2, 10a-3, 10a-4

PERSONAL MOBILITY AND CONTROL METHOD THEREOF

CROSS-REFERENCE TO RELATED APPLICATION

This application is based on and claims priority under 35 U.S.C. § 119 to Korean Patent Application No. 10-2020-0084911, filed on Jul. 9, 2020 in the Korean Intellectual Property Office, the disclosure of which is incorporated herein by reference.

TECHNICAL FIELD

The disclosure relates to a personal mobility for performing platooning and a control method thereof.

BACKGROUND

Recently, as the market for personal mobility corresponding to a single-person mobility means powered by electricity has increased, the number of users using personal mobility has increased.

Personal mobility usually moves on sidewalks or bicycle paths, and due to the limited width of sidewalks and bicycle paths, personal mobility is often used in a row between personal mobility.

For this reason, accidents between personal mobility are frequent, and recently, group tour programs using personal mobility are increasing, and interest in platooning between personal mobility is increasing.

SUMMARY

Therefore, it is an aspect of the present disclosure to provide a personal mobility capable of adjusting a shape of a cluster in performing platooning and a control method.

In accordance with one aspect of the disclosure, a personal mobility performing platooning includes: a transceiver; and a controller configured to determine a movement command for a slave of the platooning based on driving information when the personal mobility is configured as a master of the platooning and adjust a cluster shape of the platooning by controlling the transceiver to transmit the movement command to the slave.

When it is determined that the personal mobility moves in a direction in which the slave of platooning is located based on the driving information, the controller may be configured to determine a movement command for the slave to cause the slave to move in a direction opposite to a direction in which the personal mobility is located.

When it is determined that the movement of the personal mobility forms a closed curve based on the driving information, the controller may be configured to determine a movement command for the slave to cause the slave to move inside the closed curve.

The controller may be configured to determine a movement command for the slave to cause the slave to drive in a cluster size corresponding to an area of the closed curve.

When it is determined that the personal mobility moves across a plurality of slaves of the platooning based on the driving information, the controller may be configured to determine a movement command for the plurality of slaves to cause the plurality of slaves to move in a direction away from a movement path of the personal mobility.

The controller may be configured to determine a movement command for at least one slave to cause the at least one slave located to the left of the movement path of the personal mobility among the plurality of slaves to perform platooning, and determine a movement command for at least another slave to cause the at least another slave located to the right of the movement path of the personal mobility among the plurality of slaves to perform platooning.

The personal mobility may further include: a sensor configured to detect an external object, and the controller may be configured to determine whether the slave of the platooning normally drives based on output of the sensor.

When it is determined that the slave of platooning drives abnormally, the controller may be configured to control the transceiver to transmit information of the slave driving abnormally to an external server.

The controller may be configured to control to move based on a movement command received from a master of the platooning when the personal mobility configured as a slave of the platooning.

In accordance with one aspect of the disclosure, a control method of a personal mobility performing platooning and including a transceiver includes: determining a movement command for a slave of the platooning based on driving information when the personal mobility is configured as a master of the platooning; and adjusting a cluster shape of the platooning by controlling the transceiver to transmit the movement command to the slave.

The adjusting the cluster shape of the platooning may include: when it is determined that the personal mobility moves in a direction in which the slave of platooning is located based on the driving information, determining a movement command for the slave to cause the slave to move in a direction opposite to a direction in which the personal mobility is located.

The adjusting the cluster shape of the platooning may include: when it is determined that the movement of the personal mobility forms a closed curve based on the driving information, determining a movement command for the slave to cause the slave to move inside the closed curve.

The determining the movement command for the slave may include: determining a movement command for the slave to cause the slave to drive in a cluster size corresponding to an area of the closed curve.

The adjusting the cluster shape of the platooning may include: when it is determined that the personal mobility moves across a plurality of slaves of the platooning based on the driving information, determining a movement command for the plurality of slaves so that the plurality of slaves move in a direction away from the movement path of the personal mobility.

The determining the movement command for the slave may include: determining a movement command for at least one slave to cause the at least one slave located to the left of the movement path of the personal mobility among the plurality of slaves to perform platooning; and determining a movement command for at least another slave to cause the at least another slave located to the right of the movement path of the personal mobility among the plurality of slaves to perform platooning.

The personal mobility may include: a sensor configured to detect an external object, and the control method further may include: determining whether the slave of the platooning normally drives based on output of the sensor.

The control method may further include: when it is determined that the slave of platooning drives abnormally, controlling the transceiver to transmit information of the slave driving abnormally to an external server.

The control method may further include: controlling to move based on a movement command received from a master of the platooning when the personal mobility is configured as a slave of the platooning.

In accordance with one aspect of the disclosure, a personal mobility platooning system includes: a server for platooning by grouping a plurality of personal mobility; a first personal mobility, among the plurality of personal mobility, configured to perform the platooning based on a control command from the server; and a second personal mobility, among the plurality of personal mobility, configured to adjust a cluster shape of the platooning, and the second personal mobility includes: a transceiver; and a controller configured to determine a movement command for the first personal mobility based on driving information and adjust the cluster shape of the platooning by controlling the transceiver to transmit the movement command to the first personal mobility.

When it is determined that the second personal mobility moves in a direction in which the first personal mobility is located based on the driving information, the controller may be configured to determine a movement command for the first personal mobility to cause the first personal mobility to move in a direction opposite to a direction in which the second personal mobility is located.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
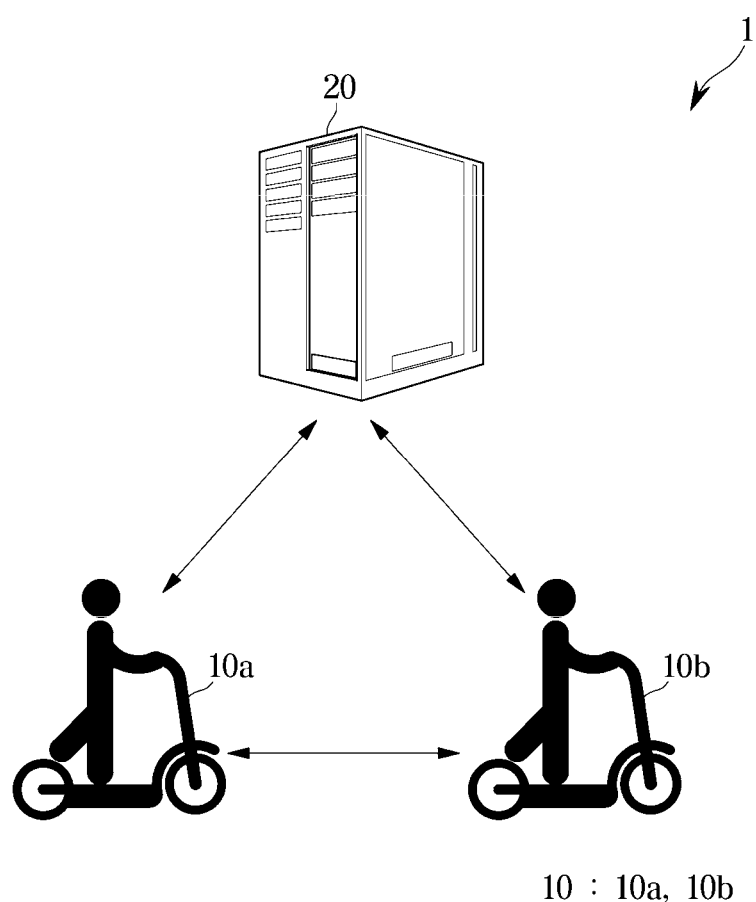
FIG. 1 is a block diagram illustrating a configuration of a personal mobility platooning system according to an embodiment.

Like reference numerals refer to like elements throughout the specification. Not all elements of embodiments of the disclosure will be described, and description of what are commonly known in the art or what overlap each other in the embodiments will be omitted.

It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements.

As used herein, the singular forms "a," "an" and "the" are intended to include the plural forms as well, unless the context clearly indicates otherwise.

As used herein, the terms "portion," "unit," "block," "member," and "module" refer to a unit that can perform at least one function or operation. For example, these terms may refer to at least one process which is performed by at least one piece of hardware such as a field-programmable gate array (FPGA) and an application specific integrated circuit (ASIC), and at least one piece of software stored in a memory or a processor.

An identification code is used for the convenience of the description but is not intended to illustrate the order of each step. Each of the steps may be implemented in an order different from the illustrated order unless the context clearly indicates otherwise.

Hereinafter, embodiments of a personal mobility and a control method thereof according to an aspect will be described in detail with reference to the accompanying drawings.

Figure 2:
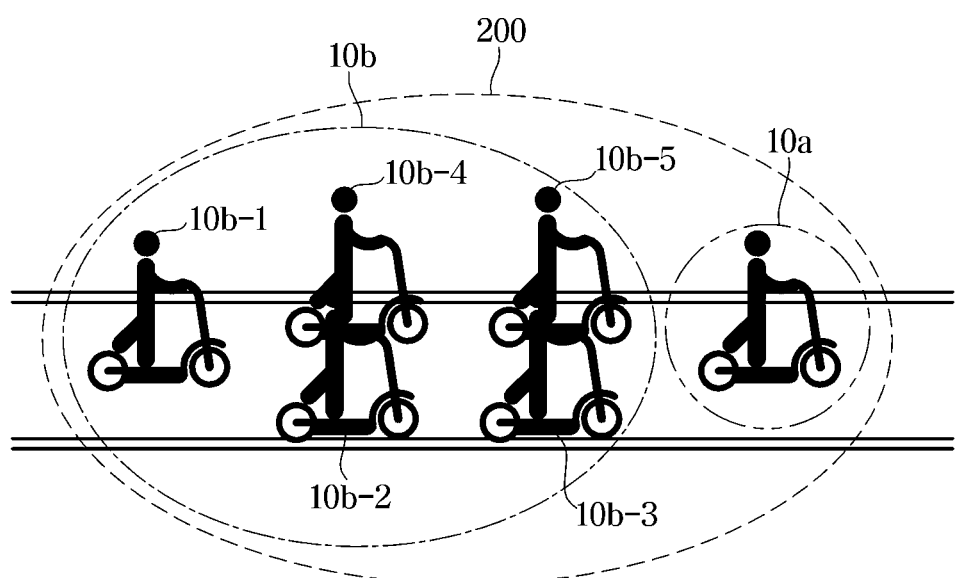
FIG. 2 is a diagram illustrating a case in which personal mobility performs platooning according to an embodiment.

FIG. 1 is a block diagram illustrating a configuration of a personal mobility platooning system according to an embodiment. FIG. 2 is a diagram illustrating a case in which personal mobility performs platooning according to an embodiment.

Referring to FIG. 1, a personal mobility platooning system 1 according to an embodiment may include a plurality of personal mobility 10 and a server 20.

Personal mobility 10 is a small mobility means powered by electricity, and may include an electric wheel, an electric kickboard, an electric scooter, an electric skateboard, an electric bicycle, or a micro electric vehicle. The type of personal mobility 10 is not limited to the above example, and includes without limitation any small mobility means powered by electricity. The personal mobility 10 as a transportation tool, powered by electricity such as a battery, may be operated and ridden by a user to move the user from one location to another location.

The plurality of personal mobility 10 includes a master 10a for guiding a group performing platooning, and a slave 10b performing platooning according to the guide of the master 10a. In this case, the slave 10b may follow the speed and direction of the master 10a based on information received from the master 10a, or may form a cluster based on a control command of platooning to drive.

For example, as shown in FIG. 2, a plurality of personal mobility 10 may include a master 10a guiding the group 200, and a plurality of slaves 10b-1, 10b-2, 10b-3, 10b-4, 10b-5, 10b.

At this time, the master 10a may adjust the form of the cluster (the form of the group 200) by transmitting a movement command to the plurality of slaves 10b. To this end, personal mobility 10 may perform known types of wireless communication with other personal mobility. An embodiment of adjusting the shape of the cluster will be described in detail later.

The server 20 may group a plurality of personal mobility 10 into one group for platooning. Specifically, the server 20 may determine and group personal mobility 10 subject to platooning based on a known criterion.

For example, the server 20 may group personal mobility 10, which should drive in the same path based on set destination information, into one group for platooning.

At this time, the server 20 transmits a control command for platooning to the grouped personal mobility 10 so that the grouped personal mobility 10 perform platooning. To this end, the server 20 may perform known types of wireless communication with personal mobility 10.

The server 20 may, according to an embodiment, determine the arrangement of personal mobility 10 in the group based on the performance of personal mobility 10 included in the group of platooning (e.g., battery remaining amount, degree of wear of component, etc.). For example, as shown in FIG. 2, the server 20 may determine a control command such that the master 10*a* is disposed at the head of the group 200 based on the driving direction by determining the personal mobility 10 having the relatively best performance as the master 10*a* and may determine the control command such that the slaves 10*b*-2, 10*b*-3, 10*b*-4, and 10-5 with relatively poor performance are placed in the middle of the group 200 based on the driving direction. The server 20 may determine a control command such that the slave 10*b*-1 having relatively good performance is disposed at the rear end of the group 200 based on the driving direction.

In the above, the personal mobility platooning system 1 has been described. Hereinafter, personal mobility 10 for performing platooning will be described in detail.

Figure 3:
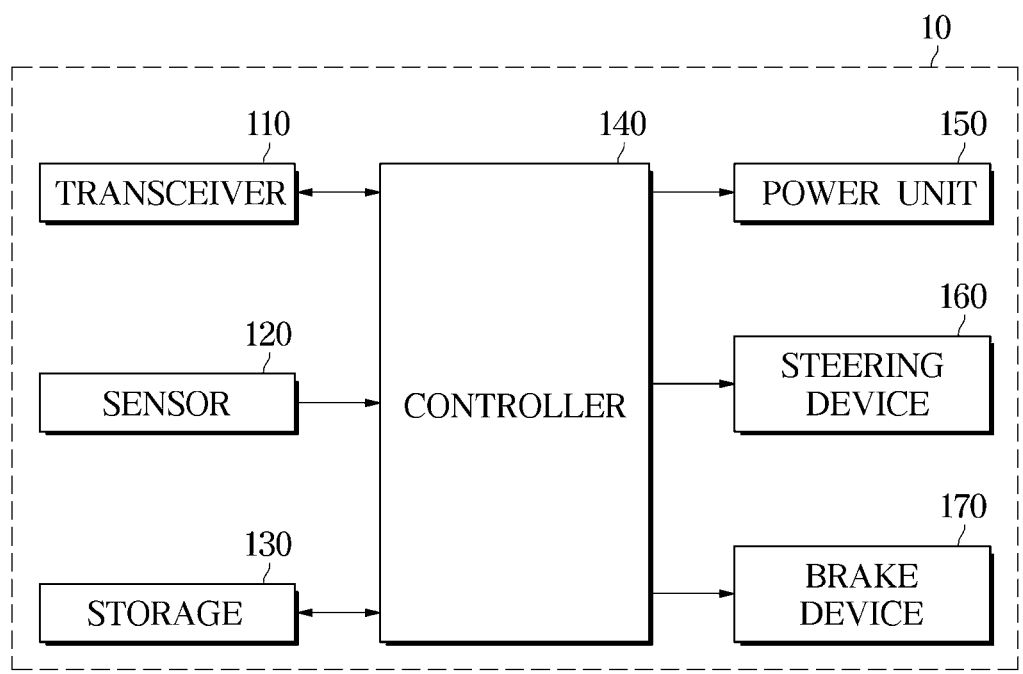
FIG. 3 is a diagram illustrating a control block diagram of personal mobility according to an embodiment.

FIG. 3 is a diagram illustrating a control block diagram of personal mobility according to an embodiment.

Referring to FIG. 3, personal mobility 10 according to an embodiment includes a transceiver 110 that communicates with an external device, a sensor 120 that detects an external object, a storage 130 that stores various information required for control, a controller 140 for determining a movement command for the slave 10*b* for adjusting the cluster shape of platooning, the power unit 150 for transmitting power to the wheel, a steering device 160 for steering the wheel, and a brake device 170 for braking the wheel.

The transceiver 110 according to an embodiment may be provided as a known type of wireless communication module to perform communication with an external device.

The transceiver 110 may receive a control command for platooning from the server 20. In addition, the transceiver 110 may transmit a movement command to a slave 10*b* when the personal mobility 10 is configured as a master 10*a*, and may receive a movement command from a master 10*a* when the personal mobility 10 is configured as a slave 10*b*.

The sensor 120 according to an embodiment may include at least one of a camera, an infrared sensor, a radar, or a lidar so as to detect an external object. However, the type of sensor included in the sensor 120 is not limited as long as it can detect an external object.

The storage 130 according to an embodiment may be provided as a known type of storage medium to store various types of information necessary for control. For example, the storage 130 may store location information (e.g., a GPS signal) received from the slave 10*b* included in the platooning group, and may store information on a movement command for the slave 10*b* according to driving information of the master 10*a*.

The controller 140 according to an embodiment determines a movement command for a slave 10*b* of platooning based on driving information when the personal mobility 10 is configured as a master 10*a* of platooning, and may adjust the cluster shape of platooning by controlling the transceiver 110 to transmit a movement command to the slave 10*b*.

In this case, the driving information may include information related to driving, such as a movement path or a moving speed of personal mobility 10, and the controller 140 may determine driving information based on location information (e.g., a GPS signal) obtained through the transceiver 110 or speed information obtained through a speed sensor provided in a main body (not shown).

In addition, the movement command for the slave 10*b* may be determined based on the location information of the slave 10*b*, and may correspond to direction information and distance information from the current position to the position in which the slave 10*b* is commanded to move. According to an embodiment, the controller 140 may determine a movement command for the slave 10*b*. According to such a movement command, the slave 10*b* moves in proportion to the speed of the personal mobility 10 away from the current position.

For example, when it is determined that personal mobility 10 moves in the direction in which the slave 10*b* of platooning is located based on driving information, the controller 140 may determine a movement command for the slave 10*b* so that the slave 10*b* moves in a direction opposite to the direction in which the personal mobility 10 is located.

In addition, when it is determined that the movement of personal mobility 10 forms a closed curve based on driving information, the controller 140 may determine a movement command for the slave 10*b* so that the slave 10*b* moves inside the closed curve.

In this case, the controller 140 may determine a movement command for the slave 10*b* so that the slave 10*b* drives in a cluster size corresponding to the area of the closed curve, according to an embodiment.

In this case, the controller 140 may determine that the personal mobility 10 forms a closed curve when the moving direction of the personal mobility 10 changes more than or equal to a preset number of times within a preset time.

In addition, when it is determined that personal mobility 10 moves across a plurality of slaves 10*b* of platooning based on driving information, the controller 140 may determine a movement command for the plurality of slaves 10*b* so that the plurality of slaves 10*b* move in a direction away from the movement path of the personal mobility 10.

In this case, the controller 140 may determine a movement command for the at least one slave 10*b* so that at least one slave 10*b* located to the left of the movement path of the personal mobility 10 among the plurality of slaves 10*b* performs platooning, and determine a movement command for the at least one slave 10*b* so that at least one slave 10*b* located to the right of the movement path of the personal mobility 10 among the plurality of slaves 10*b* performs platooning.

When personal mobility 10 is configured as a master 10*a* in platooning, the controller 140 according to an embodiment may determine whether or not the slave 10*b* of platooning normally drives based on the output of the sensor 120.

For example, the controller 140 identifies the slave 10*b* that does not drive in response to a movement command for the slave 10*b* or a control command for platooning based on the output of the sensor 120, and may determine the identified slave 10*b* as a slave 10*b* driving abnormally.

In this case, when it is determined that the slave 10*b* of platooning is driving abnormally, the controller 140 may control the transceiver 110 to transmit information of the slave 10*b* driving abnormally to the server 20.

Through this, the server 20 may determine whether platooning is normally performed, notify this to the administrator of the personal mobility platooning system, and prevent accidents caused by abnormal driving by adjusting the control command of platooning.

When the personal mobility 10 is configured as a slave 10b of platooning, the controller 140 according to an embodiment may control at least one of the driving device 150, the steering device 160, or the brake device 170 to move based on a movement command received from a master 10a of platooning.

The controller 140 according to an embodiment may control at least one of the driving device 150, the steering device 160, or the brake device 170 to perform the platooning according to a control command of platooning received from the server 20.

The controller 140 may include at least one memory in which programs for performing the above-described operations and operations described below are stored, and at least one processor for executing the stored programs to perform the above-described operations and operations. In the case of a plurality of memory and processors, it is possible that they are integrated in one chip, and it is also possible to be provided in a physically separate location.

The power unit 150 according to an embodiment enables personal mobility 10 to drive by transmitting power to the wheel. That is, the power unit 150 may transmit power to the wheel according to the control of the controller 140 or the user's manipulation. In this case, the power unit 150 may correspond to a motor driven by electricity.

The steering device 160 according to an embodiment may adjust a driving direction of personal mobility 10 by steering a wheel. That is, the steering device 160 may steer the wheel according to the control of the controller 140 or the user's manipulation.

The brake device 170 according to an embodiment may brake personal mobility 10 by braking a wheel. That is, the brake device 170 may brake a wheel according to the control of the controller 140 or a user's manipulation, and a known type of brake device may be used.

In the above, each configuration of personal mobility 10 has been described. Hereinafter, personal mobility 10 will be described in detail with respect to adjusting the cluster shape of platooning.

Figure 4:
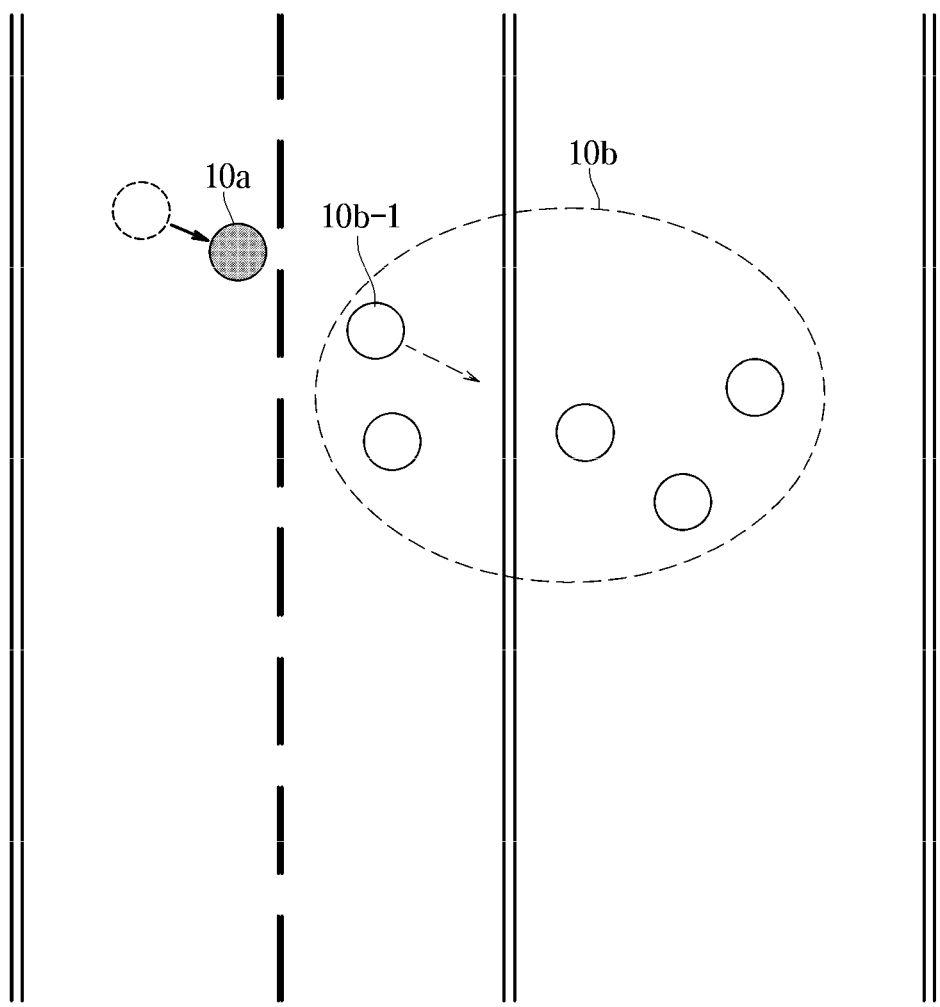
FIG. 4 is a diagram illustrating a case in which personal mobility moves in a direction in which a slave is located to induce a cluster shape according to an embodiment.
Figure 5:
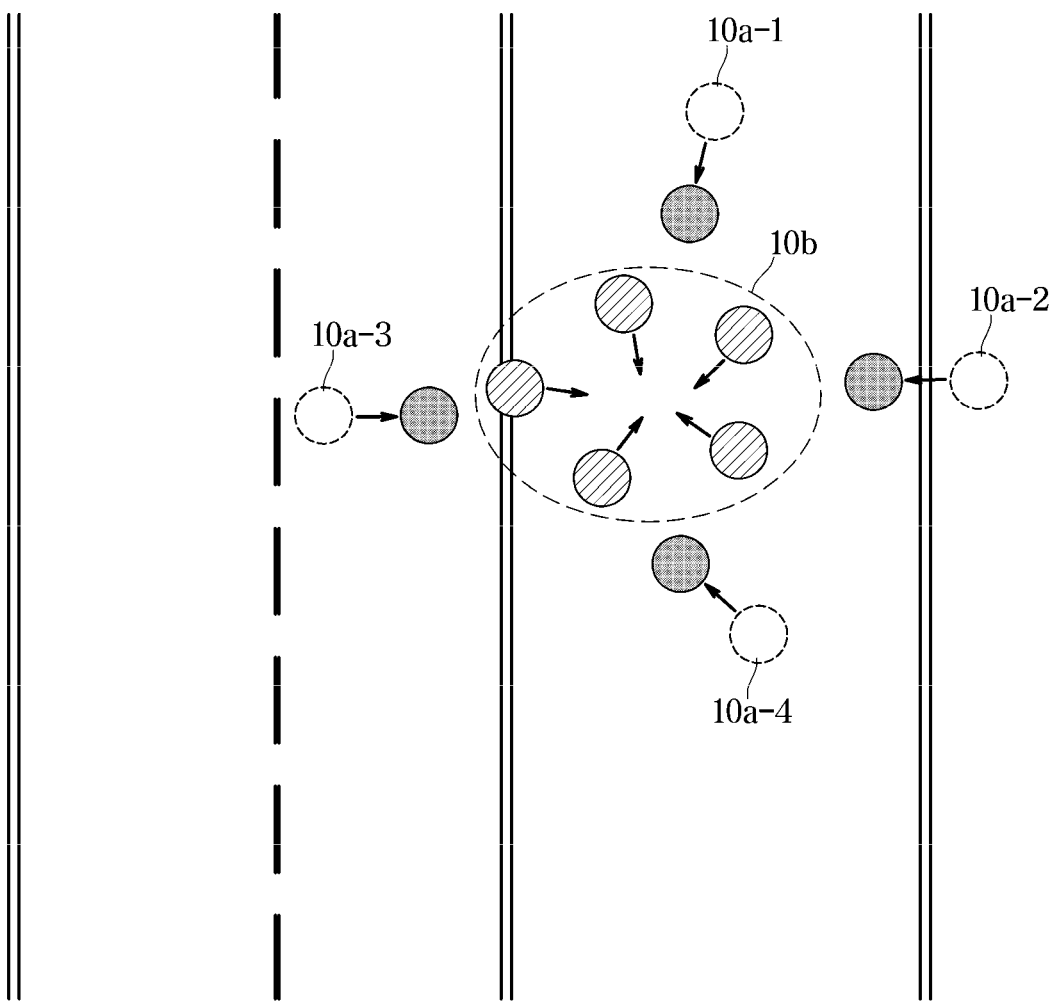
FIG. 5 is a diagram illustrating a case in which there are a plurality of masters in platooning of personal mobility according to an embodiment.

FIG. 4 is a diagram illustrating a case in which personal mobility moves in a direction in which a slave is located to induce a cluster shape according to an embodiment. FIG. 5 is a diagram illustrating a case in which there are a plurality of masters in platooning of personal mobility according to an embodiment.

Referring to FIG. 4, when the personal mobility 10 configured as a master 10a of the platooning, when it is determined that the personal mobility 10 moves in a direction in which a slave 10b of platooning is located based on the driving information, the controller 140 of the personal mobility 10 may determine a movement command for the slave 10b so that the slave 10b moves in a direction opposite to a direction in which the personal mobility 10 is located.

For example, as shown in FIG. 4, when the master 10a moves in the direction in which the first slave 10b-1 is located, the master 10a may determine a movement command for the first slave 10b-1 so that the first slave 10b-1 moves in a direction opposite to the direction in which the master 10a is located, and may transmit the movement command for the first slave 10b-1 to the first slave 10b-1.

In addition, as shown in FIG. 5, when a cluster is formed in a state in which a plurality of personal mobility 10 is scattered, the server 20 may determine a plurality of masters 10a. Specifically, the server 20 may determine personal mobilities 10 located at the outermost end of each of the four orientations (east, west, south, north) as the master 10a.

In this case, the plurality of masters 10a-1, 10a-2, 10a-3, and 10a-4 move in the direction in which the slave 10b is located, and may allow the slave 10b to move in a direction opposite to the direction in which the master 10a is located so that the slaves 10b form cluster.

As described above, when the master 10a approaches the slave 10b, the slave 10b moves away from the master 10a, so that the master 10a may adaptively adjust the cluster shape of platooning. In other words, the driver of the master 10a may adaptively adjust the cluster shape of platooning by controlling the master 10a to move around the slave 10b.

Figure 6:
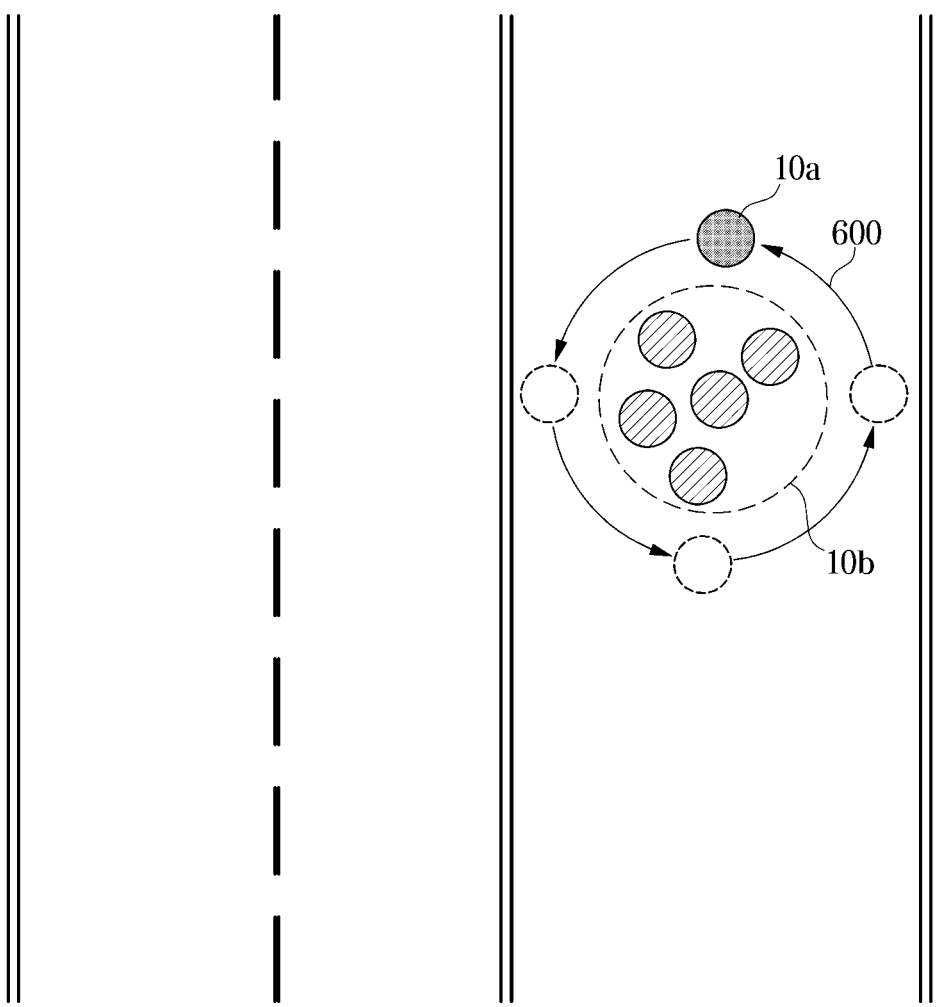
FIG. 6 is a diagram illustrating a case in which a cluster shape is induced by moving personal mobility to form a closed curve according to an embodiment.

FIG. 6 is a diagram illustrating a case in which a cluster shape is induced by moving personal mobility to form a closed curve according to an embodiment.

Referring to FIG. 6, when personal mobility 10 is configured as a master 10a, when it is determined that the movement of personal mobility 10 forms a closed curve 600 based on driving information, the controller 140 of the personal mobility 10 may determine a movement command for the slave 10b so that the slave 10b moves inside the closed curve 600.

In this case, the controller 140 of the personal mobility 10 may determine a movement command for the slave 10b so that the slave 10b drives in a cluster size corresponding to the area of the closed curve 600, according to an embodiment.

Specifically, the controller 140 of the personal mobility 10 determines a movement command for the plurality of slaves 10b so that the plurality of slaves 10b performing platooning may be positioned while maintaining the maximum distance from each other within the area of the closed curve 600. Through this, the plurality of slaves 10b may drive in a cluster shape having an area corresponding to the area of the closed curve 600.

In this case, the controller 140 of the personal mobility 10 may determine that the personal mobility 10 forms a closed curve when the moving direction of the personal mobility 10 changes more than or equal to a preset number of times within a preset time.

Figure 7:
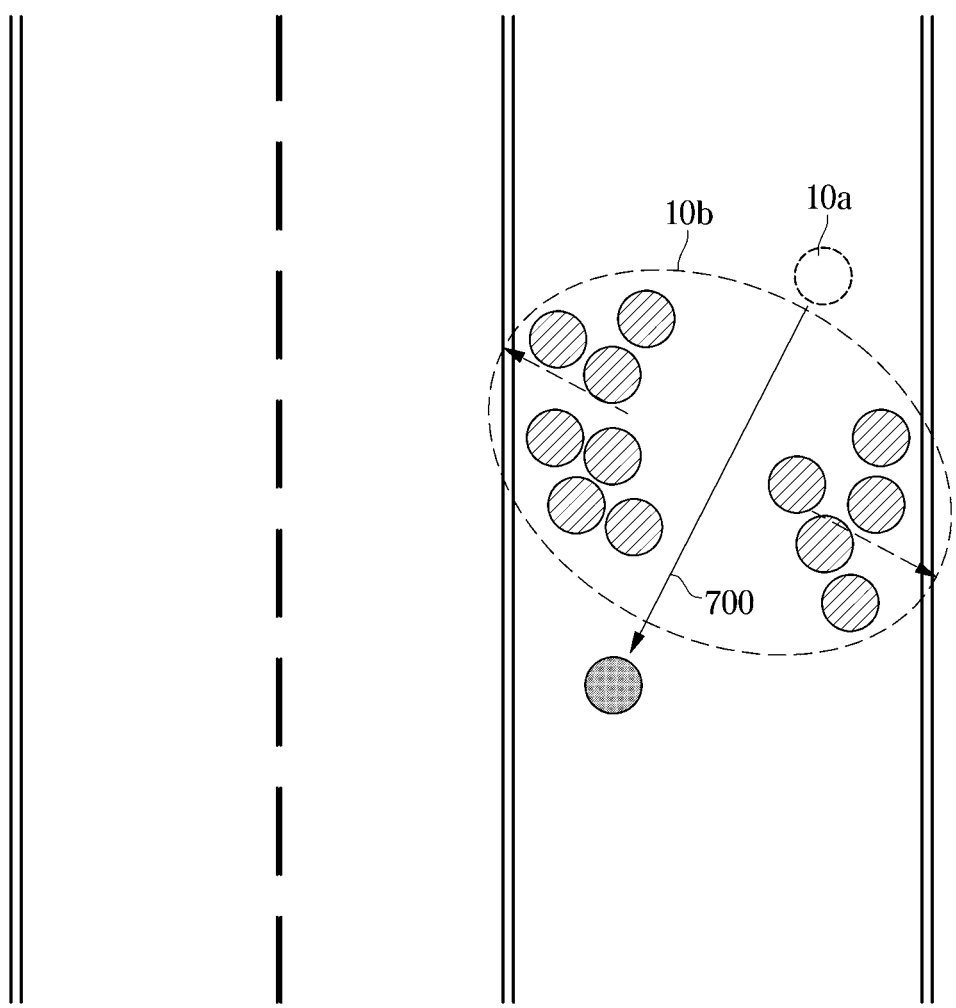
FIG. 7 is a diagram illustrating a case in which personal mobility divides groups during platooning according to an embodiment.
Figure 8:
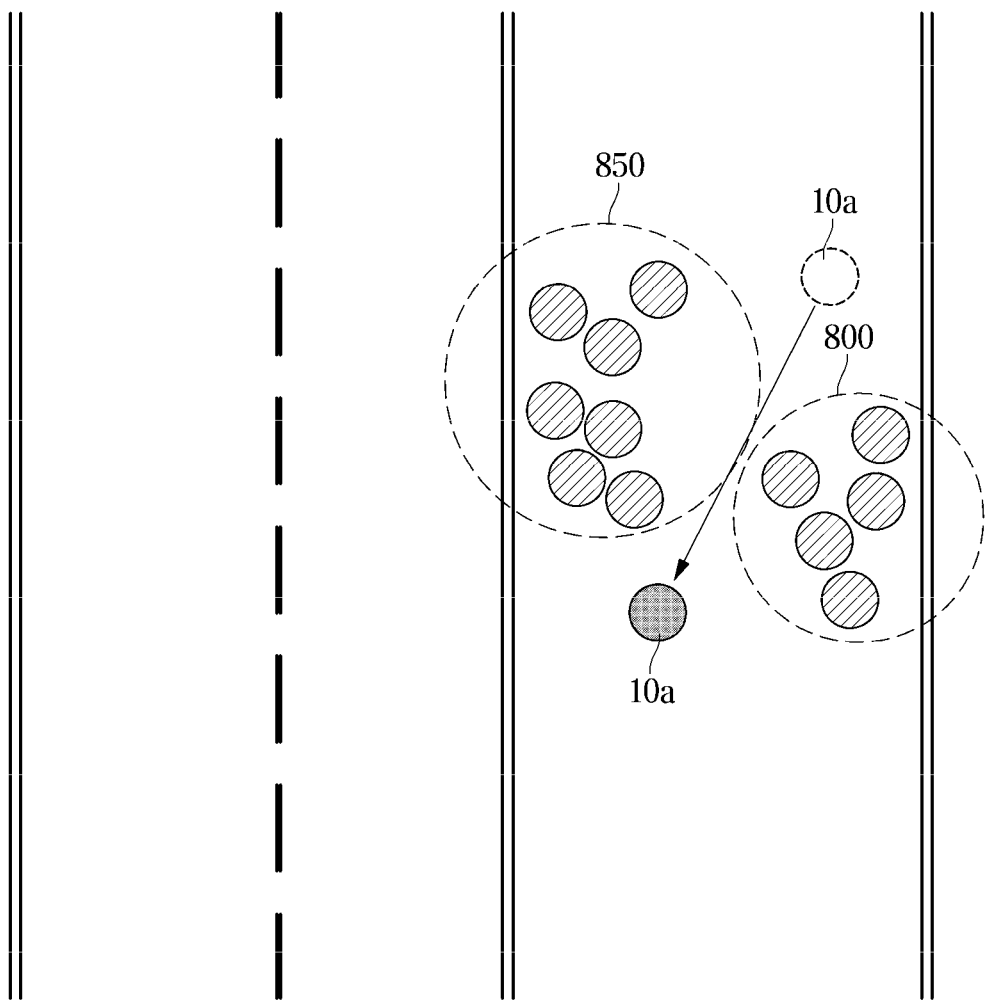
FIG. 8 is a diagram illustrating groups divided according to movement of personal mobility according to an embodiment.

FIG. 7 is a diagram illustrating a case in which personal mobility divides groups during platooning according to an embodiment. FIG. 8 is a diagram illustrating groups divided according to movement of personal mobility according to an embodiment.

Referring to FIG. 7, when the personal mobility 10 configured as a master 10a, when it is determined that the personal mobility 10 moves across a plurality of slaves 10b of the platooning based on the driving information, the controller 140 may determine a movement command for the plurality of slaves 10b so that the plurality of slaves 10b move in a direction away from the movement path 700 of the personal mobility 10.

In this case, the controller 140 of the personal mobility 10 may determine a movement command for the at least one slave 10b so that at least one slave 10b located to the left of the movement path of the personal mobility 10 among the plurality of slaves 10b performs platooning, and determine a movement command for the at least one slave 10b so that at least one slave 10b located to the right of the movement path of the personal mobility 10 among the plurality of slaves 10b performs platooning.

That is, the controller 140 of the personal mobility 10 instructs at least one slave 10b located to the left of the movement path of the personal mobility 10 among the plurality of slaves 10b to be grouped into the first group 800 to perform the platooning. In addition, the controller 140 of the personal mobility 10 instructs at least one slave 10b located to the right of the movement path of the personal mobility 10 among the plurality of slaves 10b to be grouped into the second group 850 to perform the platooning, thereby dividing the existing platooning group into smaller groups. At this time, the server 20 may determine the master in the smaller group, and the master may adjust the cluster shape of the smaller group by transmitting a movement command to the slave thereof.

Hereinafter, a control method of a personal mobility 10 according to an embodiment will be described. Personal mobility 10 according to the above-described embodiment may be applied to a control method of a personal mobility 10 to be described later. Accordingly, the contents described above with reference to FIGS. 1 to 8 are equally applicable to a control method of a personal mobility 10 according to an embodiment, even if there is no special mention.

Figure 9:
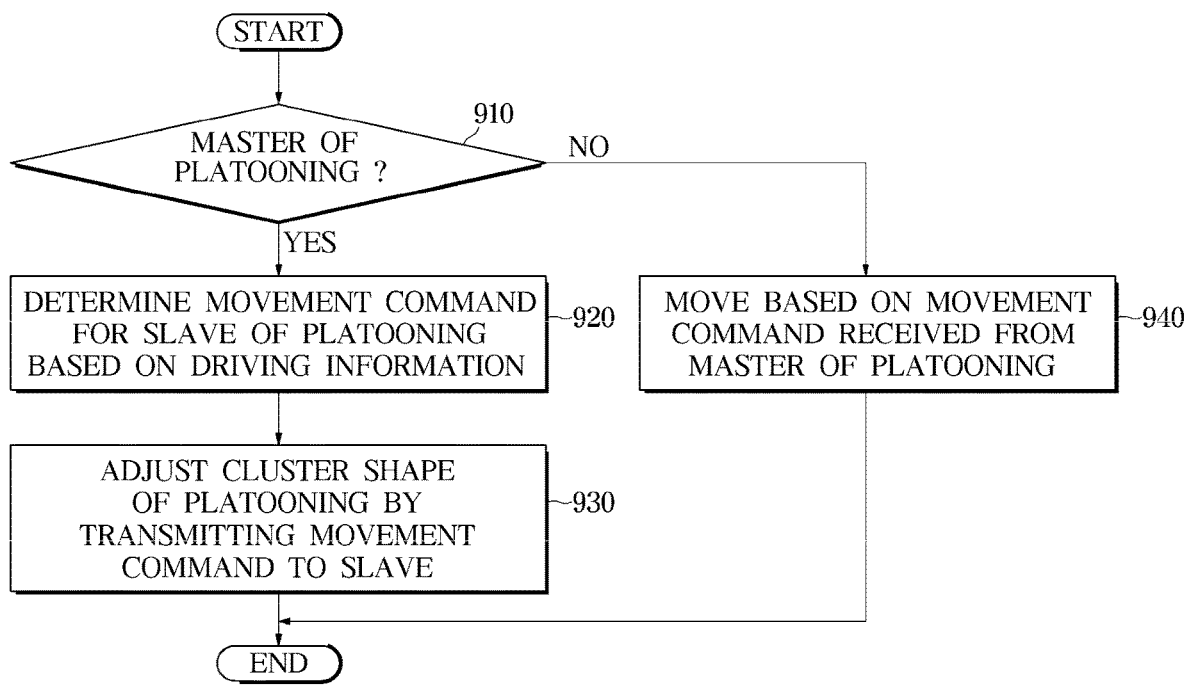
FIG. 9 is a flowchart illustrating a case of adjusting a cluster shape by operating as a master in a control method of personal mobility according to an embodiment.

FIG. 9 is a flowchart illustrating a case of adjusting a cluster shape by operating as a master in a control method of personal mobility according to an embodiment.

Referring to FIG. 9, personal mobility 10 according to an embodiment may determine a movement command for a slave 10b of platooning based on driving information (920) when the personal mobility 10 is configured as a master 10a of platooning (YES in 910), and may adjust the cluster shape of platooning by transmitting a movement command to the slave 10b (930).

For example, when it is determined that the personal mobility 10 moves in the direction in which the slave 10b of platooning is located based on driving information, the controller 140 of the personal mobility 10 may determine a movement command for the slave 10b so that the slave 10b moves in a direction opposite to the direction in which the personal mobility 10 is located.

In addition, when it is determined that the movement of personal mobility 10 forms a closed curve based on driving information, the controller 140 of the personal mobility 10 may determine a movement command for the slave 10b so that the slave 10b moves inside the closed curve.

In this case, the controller 140 of the personal mobility 10 may determine a movement command for the slave 10b so that the slave 10b drives in a cluster size corresponding to the area of the closed curve, according to an embodiment.

In this case, the controller 140 of the personal mobility 10 may determine that the personal mobility 10 forms a closed curve when the moving direction of the personal mobility 10 changes more than or equal to a preset number of times within a preset time.

In addition, when it is determined that personal mobility 10 moves across a plurality of slaves 10b of platooning based on driving information, the controller 140 of the personal mobility 10 may determine a movement command for the plurality of slaves 10b so that the plurality of slaves 10b move in a direction away from the movement path of the personal mobility 10.

In this case, the controller 140 of the personal mobility 10 may determine a movement command for the at least one slave 10b so that at least one slave 10b located to the left of the movement path of the personal mobility 10 among the plurality of slaves 10b performs platooning, and determine a movement command for the at least one slave 10b so that at least one slave 10b located to the right of the movement path of the personal mobility 10 among the plurality of slaves 10b performs platooning.

In addition, the personal mobility 10 according to an embodiment may move based on a movement command received from a master 10a of platooning when the personal mobility 10 is not the master 10a of platooning (No in 910) (940).

As described above, when the master 10a approaches the slave 10b, the slave 10b moves away from the master 10a, so that the master 10a may adaptively adjust the cluster shape of platooning. In other words, the driver of the master 10a may adaptively adjust the cluster shape of platooning by controlling the master 10a to move around the slave 10b.

Meanwhile, the disclosed embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a computer-readable recording medium.

The computer-readable recording medium may include all kinds of recording media storing commands that can be interpreted by a computer. For example, the computer-readable recording medium may be ROM, RAM, a magnetic tape, a magnetic disc, flash memory, an optical data storage device, etc.

According to a personal mobility and a control method thereof according to an aspect, when performing platooning, adaptive platooning can be performed by adjusting the shape of the cluster.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A personal mobility performing platooning, comprising:
   a transceiver; and
   a controller configured to determine a movement command for a slave of the platooning based on driving information when the personal mobility is configured as a master of the platooning, and to adjust a cluster shape of the platooning by controlling the transceiver to transmit the movement command to the slave,
   wherein, when it is determined that the personal mobility moves across a plurality of slaves of the platooning based on the driving information, the controller is configured to determine a movement command for the plurality of slaves to cause the plurality of slaves to move in a direction away from a movement path of the personal mobility, and
   wherein the controller is configured to determine a movement command for at least one slave to cause the at least one slave located to the left of the movement path of the personal mobility among the plurality of slaves to perform platooning, and determine a movement command for at least another slave to cause the at least another slave located to the right of the movement path of the personal mobility among the plurality of slaves to perform platooning.

2. The personal mobility according to claim 1, wherein, when it is determined that the personal mobility moves in a direction in which the slave of platooning is located based on the driving information, the controller is configured to determine a movement command for the slave to cause the slave to move in a direction opposite to a direction in which the personal mobility is located.

3. The personal mobility according to claim 1, wherein, when it is determined that movement of the personal mobility forms a closed curve based on the driving information, the controller is configured to determine a movement command for the slave to cause the slave to move inside the closed curve.

4. The personal mobility according to claim 3, wherein the controller is configured to determine a movement command for the slave to cause the slave to drive in a cluster size corresponding to an area of the closed curve.

5. The personal mobility according to claim 1, further comprising:
a sensor configured to detect an external object, and
wherein the controller is configured to determine whether the slave of the platooning normally drives based on output of the sensor.

6. The personal mobility according to claim 5, wherein, when it is determined that the slave of platooning drives abnormally, the controller is configured to control the transceiver to transmit information of the slave driving abnormally to an external server.

7. The personal mobility according to claim 1, wherein the controller is configured to control to move based on a movement command received from a master of the platooning when the personal mobility is configured as a slave of the platooning.

8. A control method of a personal mobility performing platooning and comprising a transceiver, the method comprises:
determining a movement command for a slave of the platooning based on driving information when the personal mobility is configured as a master of the platooning; and
adjusting a cluster shape of the platooning by controlling the transceiver to transmit the movement command to the slave,
wherein the adjusting the cluster shape of the platooning comprises: when it is determined that the personal mobility moves across a plurality of slaves of the platooning based on the driving information, determining a movement command for the plurality of slaves to cause the plurality of slaves to move in a direction away from a movement path of the personal mobility, and
wherein the determining the movement command for the slave comprises:
determining a movement command for at least one slave to cause the at least one slave located to the left of the movement path of the personal mobility among the plurality of slaves to perform platooning; and
determining a movement command for at least another slave to cause the at least another slave located to the right of the movement path of the personal mobility among the plurality of slaves to perform platooning.

9. The control method according to claim 8, wherein the adjusting the cluster shape of the platooning comprises:
when it is determined that the personal mobility moves in a direction in which the slave of platooning is located based on the driving information, determining a movement command for the slave to cause the slave to move in a direction opposite to a direction in which the personal mobility is located.

10. The control method according to claim 8, wherein the adjusting the cluster shape of the platooning comprises:

when it is determined that movement of the personal mobility forms a closed curve based on the driving information, determining a movement command for the slave to cause the slave to move inside the closed curve.

11. The control method according to claim 10, wherein the determining the movement command for the slave comprises:
determining a movement command for the slave to cause the slave to drive in a cluster size corresponding to an area of the closed curve.

12. The control method according to claim 8, wherein the personal mobility comprises:
a sensor configured to detect an external object, and
wherein the control method further comprises:
determining whether the slave of the platooning normally drives based on output of the sensor.

13. he control method according to claim 12, further comprising:
when it is determined that the slave of platooning drives abnormally, controlling the transceiver to transmit information of the slave driving abnormally to an external server.

14. The control method according to claim 8, further comprising:
controlling to move based on a movement command received from a master of the platooning when the personal mobility is configured as a slave of the platooning.

15. A personal mobility platooning system, comprising:
a server for platooning by grouping a plurality of personal mobility;
a first personal mobility, among the plurality of personal mobility, configured to perform the platooning based on a control command from the server; and
a second personal mobility, among the plurality of personal mobility, configured to adjust a cluster shape of the platooning, and
wherein the second personal mobility comprises:
a transceiver; and
a controller configured to determine a movement command for the first personal mobility based on driving information and adjust the cluster shape of the platooning by controlling the transceiver to transmit the movement command to the first personal mobility,
wherein, when it is determined that the second personal mobility moves across a plurality of the first personal mobility of the platooning based on the driving information, the controller is configured to determine a movement command for the plurality of the first personal mobility to cause the plurality of the first personal mobility to move in a direction away from a movement path of the second personal mobility, and
wherein the controller is configured to determine a movement command for at least one the first personal mobility to cause the at least one the first personal mobility located to the left of the movement path of the second personal mobility among the plurality of the first personal mobility to perform platooning, and determine a movement command for at least another the first personal mobility to cause the at least another the first personal mobility located to the right of the movement path of the second personal mobility among the plurality of the first personal mobility to perform platooning.

16. The personal mobility platooning system according to claim 15, wherein, when it is determined that the second personal mobility moves in a direction in which the first personal mobility is located based on the driving information, the controller is configured to determine a movement command for the first personal mobility to cause the first personal mobility to move in a direction opposite to a direction in which the second personal mobility is located.

\* \* \* \* \*